United States Patent
Victor

(10) Patent No.: US 6,571,868 B2
(45) Date of Patent: Jun. 3, 2003

(54) WELL HEAD LUBRICATOR ASSEMBLY WITH POLYURETHANE IMPACT-ABSORBING SPRING

(76) Inventor: Bruce M. Victor, 1762 Denver Ave., Ft. Lupton, CO (US) 80621

( * ) Notice: Subject to any disclaimer, the term of this patent is extended or adjusted under 35 U.S.C. 154(b) by 0 days.

(21) Appl. No.: 09/944,473

(22) Filed: Aug. 30, 2001

(65) Prior Publication Data

US 2002/0029878 A1 Mar. 14, 2002

Related U.S. Application Data

(60) Provisional application No. 60/231,373, filed on Sep. 8, 2000.

(51) Int. Cl.[7] .............................. E21B 33/02; F16F 1/36
(52) U.S. Cl. ...................... 166/70; 166/86.2; 267/153
(58) Field of Search ................... 166/69, 70, 373, 166/66.7, 68, 86.2; 267/153, 141, 292, 293, 294

(56) References Cited

U.S. PATENT DOCUMENTS

| | | | |
|---|---|---|---|
| 3,181,470 A | | 5/1965 | Clingman ..................... 103/52 |
| 3,806,106 A | * | 4/1974 | Hamel et al. ................ 267/152 |
| 3,902,469 A | | 9/1975 | Scott, Jr. ................. 123/117 A |
| 4,015,616 A | | 4/1977 | Hanff ........................... 137/78 |
| 4,198,037 A | | 4/1980 | Anderson .................... 267/153 |
| 4,475,722 A | * | 10/1984 | Paton et al. ................. 267/9 C |
| 4,833,973 A | | 5/1989 | Wang ........................... 91/468 |
| 4,962,916 A | | 10/1990 | Palinkas ..................... 267/153 |
| 5,052,665 A | | 10/1991 | Sakuragi ..................... 267/220 |
| 5,280,890 A | * | 1/1994 | Wydra ........................ 267/220 |
| 5,327,596 A | * | 7/1994 | Wallace et al. ................ 5/475 |
| 5,386,972 A | | 2/1995 | Hoehner et al. ............ 267/140 |
| 5,467,970 A | | 11/1995 | Ratu et al. .................. 267/220 |
| 5,704,474 A | | 1/1998 | Oland ..................... 206/308.1 |
| 5,868,384 A | | 2/1999 | Anderson ................ 267/141.1 |
| 5,957,441 A | * | 9/1999 | Tews .......................... 267/153 |
| 6,250,617 B1 | * | 6/2001 | Tews .......................... 267/153 |

* cited by examiner

Primary Examiner—Frank S. Tsay
(74) Attorney, Agent, or Firm—Flanagan & Flanagan; John R. Flanagan

(57) ABSTRACT

A lubricator assembly for a well head of a gas-producing well includes an elongated rigid tubular body having upper and lower ends and a cylindrical interior chamber open at the lower end for receiving a leading end of a gas lift plunger at the well head, a removable end cap attached at the upper end of the tubular body, and an elongated polyurethane body having a cylindrical configuration and characteristics of a coil spring in that the polyurethane body can be resiliently compressed along its longitudinal axis and will spring back to substantially its original form. The polyurethane body is disposed in the tubular body between the removable end cap and the lower end of the tubular body such that upon arrival of the plunger at the tubular body the polyurethane body will be impacted by the force of the plunger and absorb the impact force.

9 Claims, 2 Drawing Sheets

WELL HEAD LUBRICATOR ASSEMBLY WITH POLYURETHANE IMPACT-ABSORBING SPRING

This patent application claims the benefit of U.S. provisional application No. 60/231,373, filed Sep. 8, 2000.

BACKGROUND OF THE INVENTION

1. Field of the Invention

The present invention generally relates to a lubricator assembly employed at a well head of a gas-producing well and, more particularly, is concerned with a well head lubricator assembly employing a polyurethane impact-absorbing spring.

2. Description of the Prior Art

Gas-producing wells typically employ a gas lift plunger disposed within the tubing of a well and capable of traveling vertically in the tubing as the well is cycled between shut-in and opened conditions in a manner well-known to one of ordinary skill in the art. The plunger is adapted to rise vertically under the force of sufficient gas pressure to drive or lift the plunger and a slug of liquid, such as oil, above it to the surface or well head while isolating the base of the liquid slug from the gas which lifts the plunger. The plunger falls by gravity back down the tubing of the well after the slug of liquid has been delivered to the surface and the pressure of gas flowing from the well tubing has decreased below the force of gravity on the plunger.

Such gas-producing wells also typically employ a lubricator assembly mounted at the well head in communication with the upper end of the well tubing. The various functions of the lubricator assembly are to (1) catch the plunger when it arrives at the well head, (2) externally mount a sensor which detects the arrival of the plunger at the lubricator and sends a signal to an electronic controller at the well head, and (3) permit easy access to the plunger when required for maintenance purposes.

Heretofore, as seen in FIGS. 1 and 2, one conventional lubricator assembly, generally designated 10, has included an elongated rigid tubular body 12 defining an interior chamber 14 of a substantially cylindrical configuration, an end cap 16 removably mounted on and closing an upper end portion 12a of the tubular body 12, a strike plate 18 disposed in the interior chamber 14 at a lower end portion 12b of the tubular body 12, and an elongated coil spring 20 disposed in the interior chamber 14 of the tubular body 12 between the upper end cap 16 and lower strike plate 18. The coil spring 20 is made of a suitable metal, such as conventional steel, and is intended to function to absorb the high impact forces generated by the leading end of the arriving plunger on the strike plate 18 and thereby protect the rest of the structure of the lubricator assembly 10.

Under certain operating conditions and for various reasons, the problem of premature collapse and failure of the conventional steel coil spring 20 has been experienced, in some cases in a relatively short period of time. The collapse and failure of the steel coil spring 20 allows the plunger to hit substantially with full force against the end cap 16 on the tubular body 12 of the lubricator assembly 10, causing the plunger to break up and get stuck in the tubular body 12 which requires a shutdown of the well to make the necessary repair and/or replacement of damaged components.

Consequently, a need exists for an innovation in the construction of the lubricator assembly employed at the well head of a gas-producing well which will provide a solution to the aforementioned problem without introducing any new problems in place thereof.

SUMMARY OF THE INVENTION

The present invention provides an improved lubricator assembly designed to satisfy the aforementioned need. The improved lubricator assembly of the present invention employs a polyurethane spring which will withstand the impact forces generated by extremely high plunger speeds without failure compared to the conventional metal, namely steel, coil spring which will collapse and fail under the same conditions. In testing the polyurethane spring versus the conventional steel coil spring, the steel coil spring failed within three days whereas the polyurethane spring after sixty days was still in excellent condition.

Accordingly, the present invention is directed to a well head lubricator assembly which comprises: (a) an elongated rigid tubular body having an upper end and a lower end and defining an interior chamber open at the lower end of the tubular body for receiving a leading end of a plunger at a well head, the tubular body having an end structure thereon closing the interior chamber at the upper end of the tubular body; and (b) an elongated body made substantially of a polyurethane material and having a longitudinal axis and characteristics of a coil spring in that the elongated body is capable of resiliently compressing along the longitudinal axis and of springing back to substantially an original form of the elongated body, the elongated body being disposed in the interior chamber of the tubular body between the end structure and the lower end of the tubular body such that upon arrival of the plunger at the tubular body the elongated body will be impacted by the force of the plunger and absorb the impact force.

The present invention also is directed to an impact-absorbing spring which comprises: (a) an elongated body made substantially of a polyurethane material and having a longitudinal axis; (b) the elongated body also having the characteristics of a coil spring in that the elongated body is capable of resiliently compressing along the longitudinal axis thereof and of springing back substantially to an original form.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
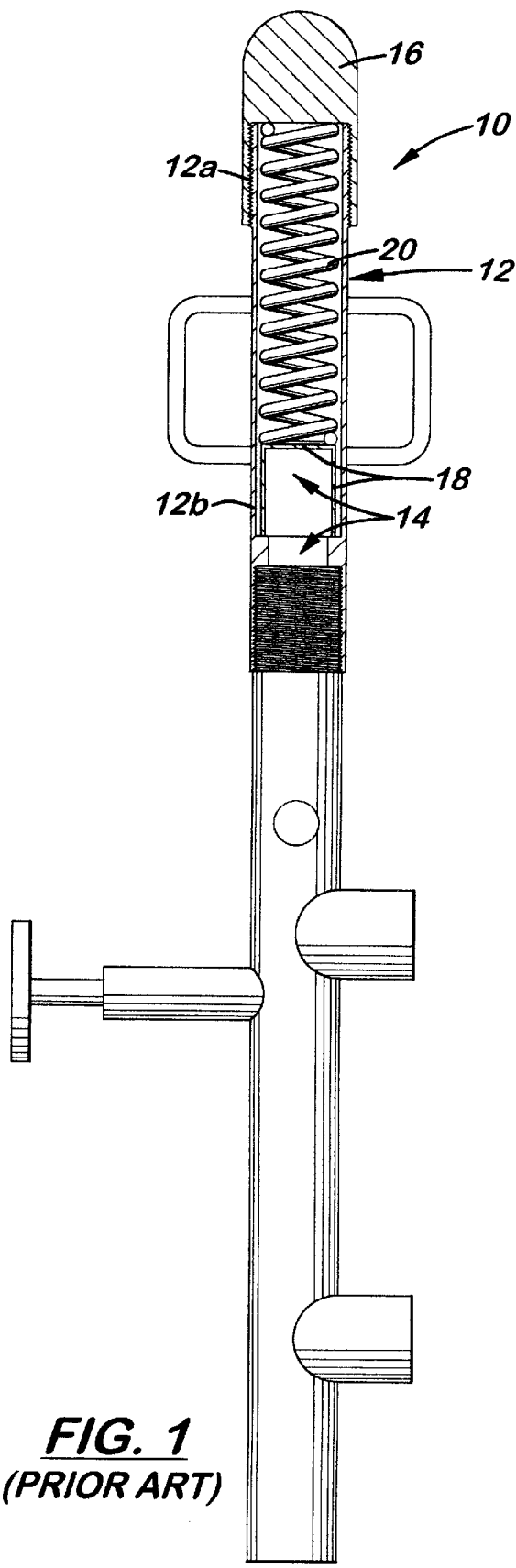
FIG. 1 is a side elevational view of a well head of a gas-producing well having a prior art lubricator assembly mounted thereon and shown in longitudinal sectional form.
Figure 2:
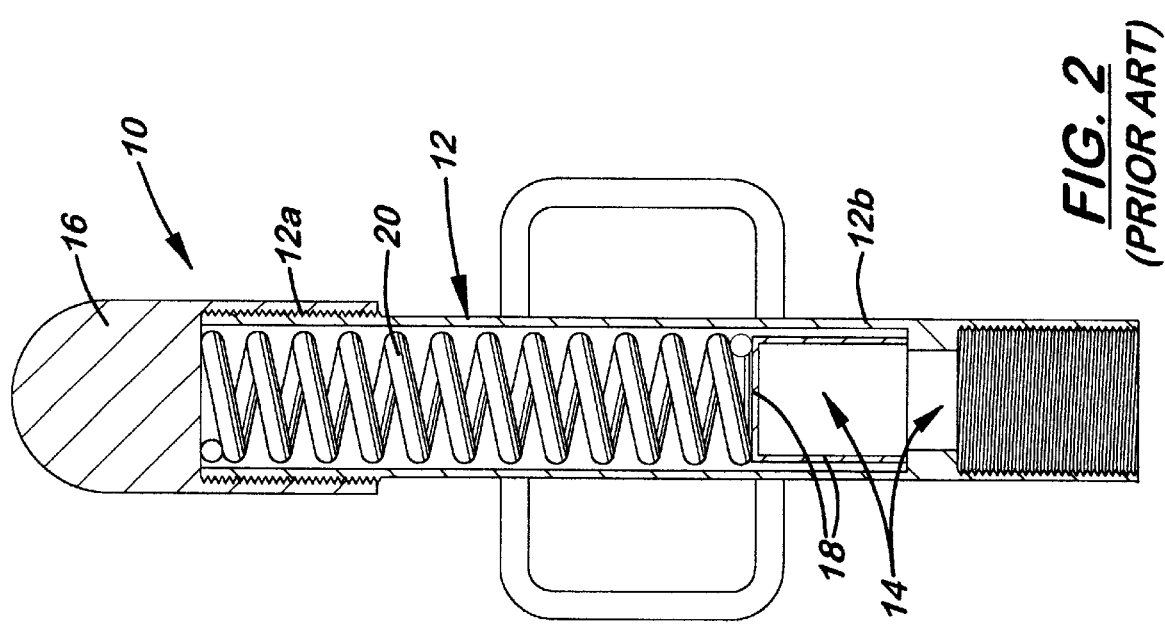
FIG. 2 is an enlarged view of the prior art lubricator assembly of FIG. 1 shown removed from the well head.
Figure 3:
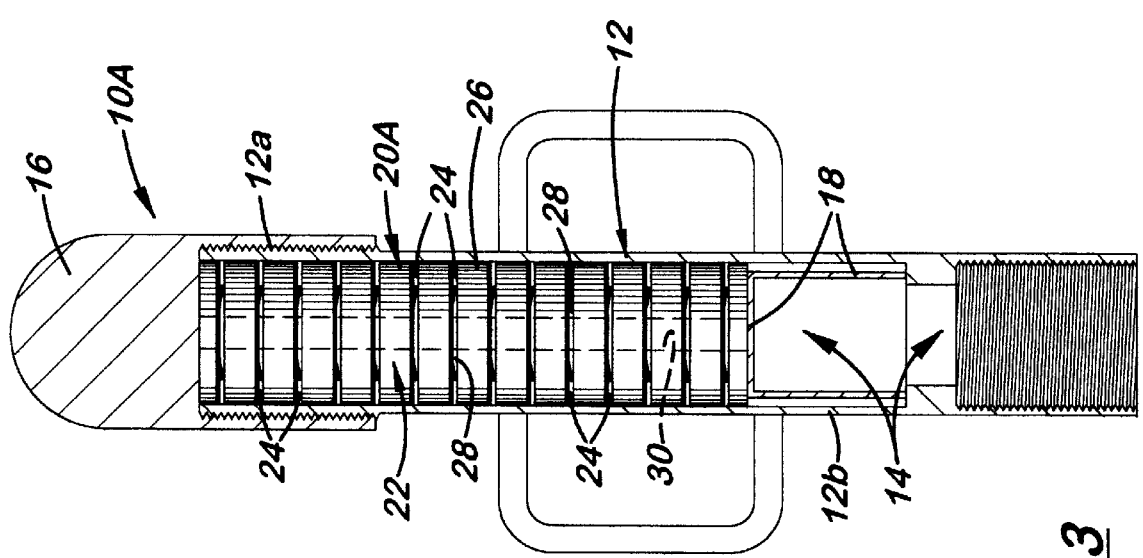
FIG. 3 is a view of an improved lubricator assembly employing a polyurethane spring in accordance with the present invention rather than the prior art metal coil spring of prior art lubricator assembly of FIGS. 1 and 2.

Referring to the drawings and particularly to FIG. 3, there is illustrated an improved lubricator assembly, generally designated 10A, of the present invention which utilizes a polyurethane impact-absorbing spring 20A in place of the conventional steel coil spring 20 of FIG. 1. The other components of the improved lubricator assembly 10A are the same as in the prior art lubricator assembly 10 of FIG. 2 and so are identified by the same reference numerals.

Figure 4:
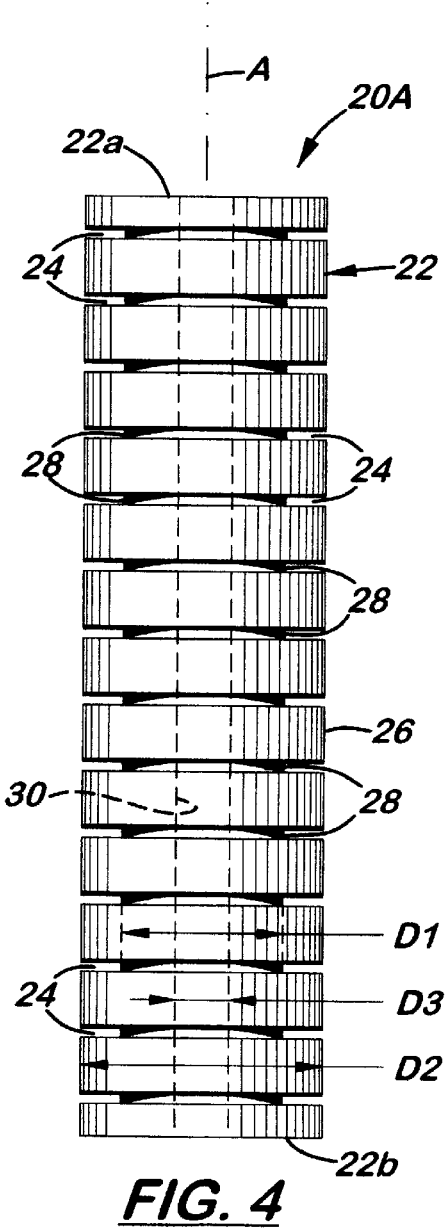
FIG. 4 is an enlarged side elevational view of the polyurethane impact-absorbing spring of the present invention shown removed from the improved lubricator assembly of FIG. 3.

Referring to FIGS. 3 and 4, the polyurethane spring 20A includes an elongated body 22 made substantially of a polyurethane material in a substantially cylindrical configuration and having a longitudinal axis A and the characteristics of a coil spring in that the elongated body 22 is capable of resiliently compressing along its longitudinal axis and of springing back to substantially its original form. The elongated body 22 of the polyurethane spring 20A is disposed in the tubular body 12, in substantially the same position as the steel coil spring 20 it replaces, between the removable end cap 16 and strike plate 18 of the lubricator assembly 10A such that via the strike plate 18 the elongated body 22 is engaged by the leading end of the plunger and absorbs the impact of the arrival of the plunger at the tubular body 22.

The elongated body 22 can optionally having a plurality of annular grooves 24 defined into a cylindrical exterior surface 26 of the body 22, extending from the exterior surface 26 to annular bottoms 28 of the respective grooves 24. The annular grooves 24 also are spaced apart from one another along the longitudinal axis A. The elongated body 22 also can have an elongated central bore 30 extending between opposite ends 22a, 22b of the elongated body 22 along the longitudinal axis A thereof. As seen in FIG. 4, the elongated body 22 has an inside diameter D1 at the bottoms 28 of the grooves 24 which is substantially less than an outside diameter D2 of the portion of the elongated body 22 between the grooves 24 and substantially greater than the diameter D3 of the central bore 30 through the elongated body 22.

As an example, the elongated body 22 of the polyurethane spring 20A can be made of black polyurethane of Shore A 90+/−5, of 9+/−0.125 inches in length and 2.25 inches in outside diameter. The elongated body 22 of the spring 20A can have other combinations of lengths, diameters, colors and Shore values.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A well head lubricator assembly, comprising:
   (a) an elongated rigid tubular body having an upper end and a lower end and defining an interior chamber open at said lower end of said tubular body for receiving a leading end of a plunger at a well head, said tubular body having an end structure thereon closing said interior chamber at said upper end of said tubular body; and
   (b) an elongated body made substantially of a polyurethane material and having a longitudinal axis and characteristics of a coil spring in that said elongated body is capable of resiliently compressing along said longitudinal axis and of springing back to substantially an original form of said elongated body, said elongated body being disposed in said interior chamber of said tubular body between said end structure and said lower end of said tubular body such that upon arrival of the plunger at the tubular body said elongated body will be impacted by the force of the plunger and absorb the impact force.

2. The assembly of claim 1 wherein said elongated body made substantially of a polyurethane material has a pair of opposite ends and a central bore defined therethrough so as extend between said opposite ends and along said longitudinal axis thereof.

3. The assembly of claim 1 wherein said elongated body made substantially of a polyurethane material has an exterior surface and a plurality of annular grooves defined therein so as to extend around and from said exterior surface radially inwardly toward said longitudinal axis to bottoms of said grooves spaced from said longitudinal axis, said annular grooves also being spaced apart from one another along said longitudinal axis.

4. The assembly of claim 3 wherein said elongated body made substantially of a polyurethane material has a pair of opposite ends and a central bore defined therethrough so as extend between said opposite ends and along said longitudinal axis thereof.

5. The assembly of claim 4 wherein said central bore is spaced radially inwardly from said bottoms of said annular grooves.

6. The assembly of claim 1 wherein said end structure closing said interior chamber at said upper end of said tubular body is an end cap removably attached to said tubular body at said upper end thereof.

7. The assembly of claim 1 wherein said interior chamber of said tubular body has a substantially cylindrical shape.

8. The assembly of claim 1 wherein said elongated body made substantially of a polyurethane material has a substantially cylindrical configuration.

9. The assembly of claim 1 wherein said elongated body made substantially of a polyurethane material is made of black polyurethane of Shore A 90+/−5.

* * * * *